(12) United States Patent
Huang et al.

(10) Patent No.: US 11,500,873 B2
(45) Date of Patent: Nov. 15, 2022

(54) METHODS AND SYSTEMS FOR SEARCHING DIRECTORY ACCESS GROUPS

(71) Applicant: EMC IP Holding Company LLC, Hopkinton, MA (US)

(72) Inventors: Frank Huang, Shanghai (CN); Cherami Liu, Shanghai (CN); Aaron Ren Wang, Shanghai (CN); Hanson Wang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 200 days.

(21) Appl. No.: 16/118,133

(22) Filed: Aug. 30, 2018

(65) Prior Publication Data
US 2020/0042609 A1    Feb. 6, 2020

(30) Foreign Application Priority Data
Aug. 3, 2018    (CN) .......................... 201810878255.6

(51) Int. Cl.
*G06F 16/245* (2019.01)
*G06F 16/2455* (2019.01)
*G06F 16/23* (2019.01)

(52) U.S. Cl.
CPC .... *G06F 16/24552* (2019.01); *G06F 16/2379* (2019.01); *G06F 16/24554* (2019.01); *G06F 16/24558* (2019.01); *G06F 16/24561* (2019.01)

(58) Field of Classification Search
CPC ........... G06F 16/24552; G06F 16/2379; G06F 16/24554; G06F 16/24558; G06F 16/24561; G06F 16/282; H04L 61/1523; H04L 41/024; H04L 63/0815; H04L 63/10
See application file for complete search history.

(56) References Cited

U.S. PATENT DOCUMENTS

| | | | |
|---|---|---|---|
| 8,868,506 B1 * | 10/2014 | Bhargava | G06F 16/1774 707/648 |
| 2002/0120597 A1 | 8/2002 | Bae | |
| 2002/0120598 A1 | 8/2002 | Shadmon et al. | |
| 2006/0241868 A1 * | 10/2006 | Sun | G16B 50/00 702/19 |
| 2011/0060844 A1 * | 3/2011 | Allan | H04L 45/66 709/241 |
| 2014/0330986 A1 | 11/2014 | Bowes et al. | |

(Continued)

FOREIGN PATENT DOCUMENTS

| | | |
|---|---|---|
| CN | 1610877 A | 4/2005 |
| CN | 101908998 A | 12/2010 |

(Continued)

*Primary Examiner* — Alford W Kindred
*Assistant Examiner* — Cao D Vuong
(74) *Attorney, Agent, or Firm* — Womble Bond Dickinson (US) LLP

(57) ABSTRACT

Methods and systems for searching directory access groups are disclosed. A set of groups associated with a logon user is determined. The set of groups is partitioned into one or more disjoint subsets, wherein each of the disjoint subsets is represented by a data representation including a root node and one or more intermediate nodes. For each of the disjoint subsets, the disjoint subset is path compressed to flatten a structure of the data representation representing the disjoint subset. The data representation is cached to a database cache.

18 Claims, 12 Drawing Sheets

(56) References Cited

U.S. PATENT DOCUMENTS

| | | | | |
|---|---|---|---|---|
| 2015/0178348 A1* | 6/2015 | Rohde | ............... | G06F 16/2379 |
| | | | | 707/734 |
| 2018/0024989 A1* | 1/2018 | Bharti | ................ | G06F 40/289 |
| | | | | 704/9 |
| 2018/0032930 A1* | 2/2018 | Kolb | .................... | G06F 40/253 |
| 2020/0026772 A1* | 1/2020 | Wheeler | ............ | G06F 16/248 |

FOREIGN PATENT DOCUMENTS

| CN | 103281211 A | 9/2013 |
|---|---|---|
| CN | 104331883 A | 2/2015 |

\* cited by examiner

| SSID | Common Name | Type | Distinguished name | Direct groups | Assigned Roles |
|---|---|---|---|---|---|
| 1 | Zhang San | User | cn=zhangs,dn=domain,dn=com | | Role1 |
| 2 | Li Si | User | cn=lis,dn=domain,dn=com | Team 1 | |
| 3 | Wang Wu | User | cn=wangw,dn=domain,dn=com | Team 2 | |
| 4 | Zhao Liu | User | cn=zhaol,dn=domain,dn=com | Team 3 | Role2 |
| 5 | Sun Qi | User | cn=sunq,dn=domain,dn=com | Team 4 | |
| 6 | Zhou Ba | User | cn=zhoub,dn=domain,dn=com | Team3 | Role3 |
| 7 | Team 1 | Group | cn=team1,dn=domain,dn=com | | |
| 8 | Team 2 | Group | cn=team2,dn=domain,dn=com | Team3 | |
| 9 | Team 3 | Group | cn=team3,dn=domain,dn=com | Team4 | Role4 |
| 10 | Team 4 | Group | cn=team4,dn=domain,dn=com | | Role5 |

FIG. 1A

| SSID | Common Name | Type | Roles | Explanations |
|---|---|---|---|---|
| 1 | Zhang San | User | Role1 | Role1 is assigned directly to Zhang San. |
| 2 | Li Si | User | Role3 | Role 3 is assigned to Team1, where Li Si belongs to. |
| 3 | Wang Wu | User | Role4, Role5 | Wang Wu belongs to Team2. Team2 belongs to Team3 and Team3 belongs to Team4. So Wang Wu inherits all roles belong to Team2, Team3, and Team4. |
| 4 | Zhao Liu | User | Role2, Role4, Role5 | Role2 is assigned directly to Zhao Liu. Role 4 and Role 5 comes from Team3 and Team4, because Zhao Liu belongs to Team3. |
| 5 | Sun Qi | User | Role5 | Role5 comes from Team4, where Sun Qi belongs to. |
| 6 | Zhou Ba | User | N/A | Zhou Ba is not assigned with any role, nor does he belong to any relevant group that is authorized. |

FIG. 4A
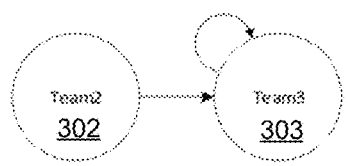
FIG. 4B
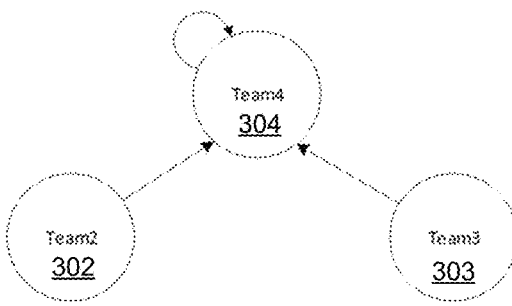
FIG. 4C
| Root SSID | Child SSID | Name | Rank | Is Root |
|---|---|---|---|---|
| 10 | 10 | Team4 | 1 | Yes |
| 10 | 9 | Team3 | 1 | No |
| 10 | 8 | Team2 | 1 | No |
FIG. 4D

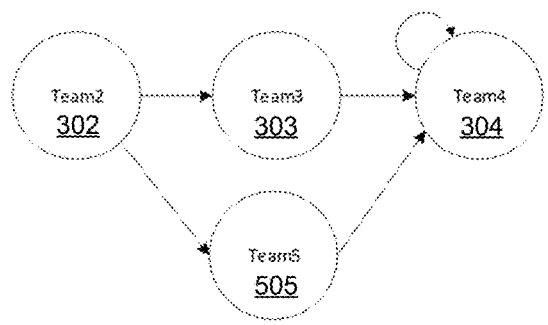
FIG. 5A
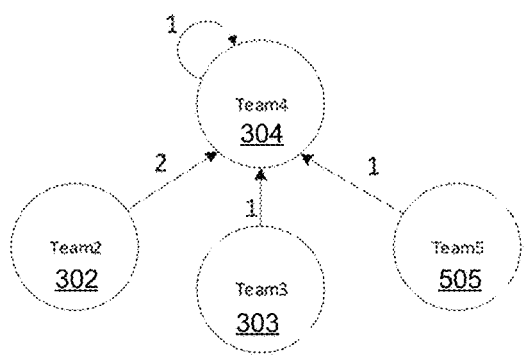
FIG. 5B
| Root SSID | Child SSID | Name  | Rank | Is Root |
|-----------|------------|-------|------|---------|
| 10        | 10         | Team4 | 1    | Yes     |
| 10        | 9          | Team3 | 1    | No      |
| 10        | 8          | Team2 | 2    | No      |
| 10        | 11         | Team5 | 1    | No      |
FIG. 5C

600

| Event | Actions to take | Time Complexity |
|---|---|---|
| Removing an existing group A from LDAP | 1. Reevaluate the graph starting from node A as the root.<br>2. Merge the graph to existing cache by decreasing the ranking | O(N) - N represents number of nodes that is children of node A |
| Adding a parent-child relationship between groups A and B(A as parent) | If A is not in the cache, simply ignore the event.<br>If A is in the cache:<br>1. Reevaluate the graph starting from node A as the root.<br>2. Merge the graph to existing cache by increasing the ranking | O(N) - N represents number of nodes that is children of node A |
| Removing a parent-child relationship between groups A and B(A as parent) | If A is not in the cache, simply ignore the event.<br>If A is in the cache:<br>1. Reevaluate the graph starting from node A as the root.<br>2. Merge the graph to existing cache by decreasing the ranking. | O(N) - N represents number of nodes that is children of node A |

FIG. 6

```
POST /zinc-system-001/ldap_cache/_search
{
  "query": {
    "bool": {
      "filter": [
        {
          "term": {
            "child_ssid": "9"
          }
        }
      ]
    }
  }
}
```

FIG. 7

```
{
  "took": 1,
  "timed_out": false,
  "_shards": {
    "total": 4,
    "successful": 4,
    "failed": 0
  },
  "hits": {
    "total": 2,
    "max_score": 0,
    "hits": [
      {
        "_index": "zinc-system-001",
        "_type": "ldap_cache",
        "_id": "AWJGgRKF-P-dNLdhy78E",
        "_score": 0,
        "_source": {
          "ldap_server": "SampleAD",
          "root_ssid": "10",
          "child_ssid": "9",
          "name": "Team3",
          "rank": 1,
          "is_root": false
        }
      },
      {
        "_index": "zinc-system-001",
        "_type": "ldap_cache",
        "_id": "AWJQ4uOm-P-dNLdhy83w",
        "_score": 0,
        "_source": {
          "ldap_server": "SampleAD",
          "root_ssid": "9",
          "child_ssid": "9",
          "name": "Team3",
          "rank": 1,
          "is_root": true
        }
      }
    ]
  }
}
```

FIG. 8

```
POST /zinc-cfg/app_role/_search
{
  "query": {
    "bool": {
      "filter": [
        {
          "terms": {
            "users": ["9","10"]
          }
        }
      ]
    }
  }
}
```

FIG. 9

```
{
  "took": 1,
  "timed_out": false,
  "_shards": {
    "total": 4,
    "successful": 4,
    "failed": 0
  },
  "hits": {
    "total": 2,
    "max_score": 0,
    "hits": [
      {
        "_index": "zinc-system-001",
        "_type": "app_role",
        "_id": "AWJQOowr-P-dNLdhy820",
        "_score": 0,
        "_source": {
          "role": "Role4",
          "users": ["9"]
        }
      },
      {
        "_index": "zinc-system-001",
        "_type": "app_role",
        "_id": "AWJhInv1-P-dNLdhy-X8",
        "_score": 0,
        "_source": {
          "role": "Role5",
          "users": ["10"]
        }
      }
    ]
  }
}
```

FIG. 10

METHODS AND SYSTEMS FOR SEARCHING DIRECTORY ACCESS GROUPS

CROSS REFERENCE TO RELATED APPLICATIONS

This application claims the benefit of Chinese Application No. 201810878255.6, filed on Aug. 3, 2018, the disclosure of which is incorporated herein by reference.

FIELD OF THE INVENTION

Embodiments of the present invention relate generally to accessing information in a directory service. More particularly, embodiments of the invention relate to methods and systems for searching directory access groups.

BACKGROUND

Directory service offers the capability of identifying users, groups, devices, and other objects, and their relationships through a directory access protocol (DAP). A simpler version of such DAP is referred to as lightweight directory access protocol (LDAP), which is generally well-known to people of ordinary skill in the art. A search product generally utilizes users from its LDAP server, and authorizes those users according to roles assigned directly to those users, or to their ancestor groups. For example, if a user belongs to group A which belongs to group B, then assigning a role to group B implicitly grants the role to all users belonging to groups A and B. Thus, it may be beneficial to have an LDAP server as a user repository, as the LDAP server can perform user role management based on groups and directory hierarchy.

Currently, firms that have a large LDAP repository with complex hierarchy are inefficient in searching for a user and all of his/her ancestor groups in order to determine his role(s) for a particular system. The search, for example, may create a large number of LDAP queries sent to an LDAP server, thereby burdening the server. Recursion depth of an LDAP query is also unpredictable. For instance, intermediate results are not cached for future usage, and therefore, LDAP exploration starts from the beginning every time. As such, user experience would degrade if a directory service is large and complex causing a search to eventually time out.

To better illustrate the point, referring now to FIG. 1A, which illustrates a data sample in a directory service, the data sample includes, among other things, common names, types (e.g., user or group), direct groups, and assigned roles. Each user or group (e.g., "Zhang San", "Team 1") can be assigned with a role (e.g., "Role1", "Role3"). In the real world, however, the amount of data is much larger and the relationships between users and groups are much more complex. FIG. 1A merely shows a small data sample for demonstration purposes. With continued reference to the data sample shown in FIG. 1A, the data can be assumed as: (i) all users and groups come from a same directory and as such, the theory can be applied to multiple directories without disturbing one another, and (ii) the service set identifier (SSID) is globally unique in the same directory.

In a conventional authorization workflow, parent groups of a current user (and subsequently grandparents and great grandparents) are recursively queried until a root node is found. In traversing the groups, all of the assigned roles for the groups are combined and specific roles for the user are determined. In more detail, referring to FIG. 1B that illustrates a conventional method of exploring directory service objects. As shown, at block 101, an LDAP object representing a current logon user is placed into a queue as a starting node of a search algorithm (e.g., breadth first search). The user can also be added to a set of search results because the roles are directly assigned to the user. At block 102, it is determined whether the queue is empty. If so, it can be determined that every relevant object has been traversed. Otherwise, at block 103, one object can be polled at a time from the queue. At block 104, an LDAP query is generated to request direct groups associated with the polled object (i.e., the user). At block 105, a list of object (e.g., parent groups) is obtained, and the objects from the list are placed into the queue and the set of search results (if they do not exist in the queue or search results). If the polled object is not associated with any direct groups, then the object is considered a root node and the list would be empty. At block 106, for every object in the set of search results (see, e.g., FIG. 1C), the role assigned to the object can be fetched, and thus, a combined list of roles can be determined for the polled object (i.e., the user).

The above-described conventional technique of exploring user groups (or directory service objects) is straight forward. However, it poses a series of problems that are critical to the user experience, and can even block business operations due to unacceptable response time. The problems, for example, can include, but not limited to, (i) inevitable traversal from a user (or an object) to a root node (or group) and the traversal is repeated every time a user is authorized, (ii) the number of groups that the user belongs to can be substantial for large firms, (iii) depth of the root group (i.e., depth that represents the length of a path to traverse from the root group to the user) is large for businesses that have complex organization, (iv) the authorization process is synchronized, and thus, the user needs to wait for such synchronization to complete, and (v) long running processes that occupy a web thread is not allowed as they can impact throughput since a web server generally has timeout settings on both client and server sides.

BRIEF DESCRIPTION OF THE DRAWINGS

Embodiments of the disclosure are illustrated by way of example and not limitation in the figures of the accompanying drawings in which like references indicate similar elements.

FIG. 1A is a diagram illustrating a data sample in a directory service.

FIG. 1C is a diagram illustrating a set of search results from invoking the conventional method.

FIGS. 4A-4D are diagrams illustrating an example of cache building according to one embodiment.

FIGS. 5A-5C are diagrams illustrating an example of merging and ranking nodes according to one embodiment.

FIG. 6 is a diagram illustrating a number of actions that can be taken to reevaluate a graph according to one embodiment.

FIG. 7 is a diagram illustrating an example of a cache query according to one embodiment.

FIG. 8 is a diagram illustrating an example of return values in response to the cache query according to one embodiment.

FIG. 9 is a diagram illustrating an example of another cache query according to one embodiment.

FIG. 10 is a diagram illustrating an example of return values in response to the other cache query according to one embodiment.

DETAILED DESCRIPTION

Figure 1B:
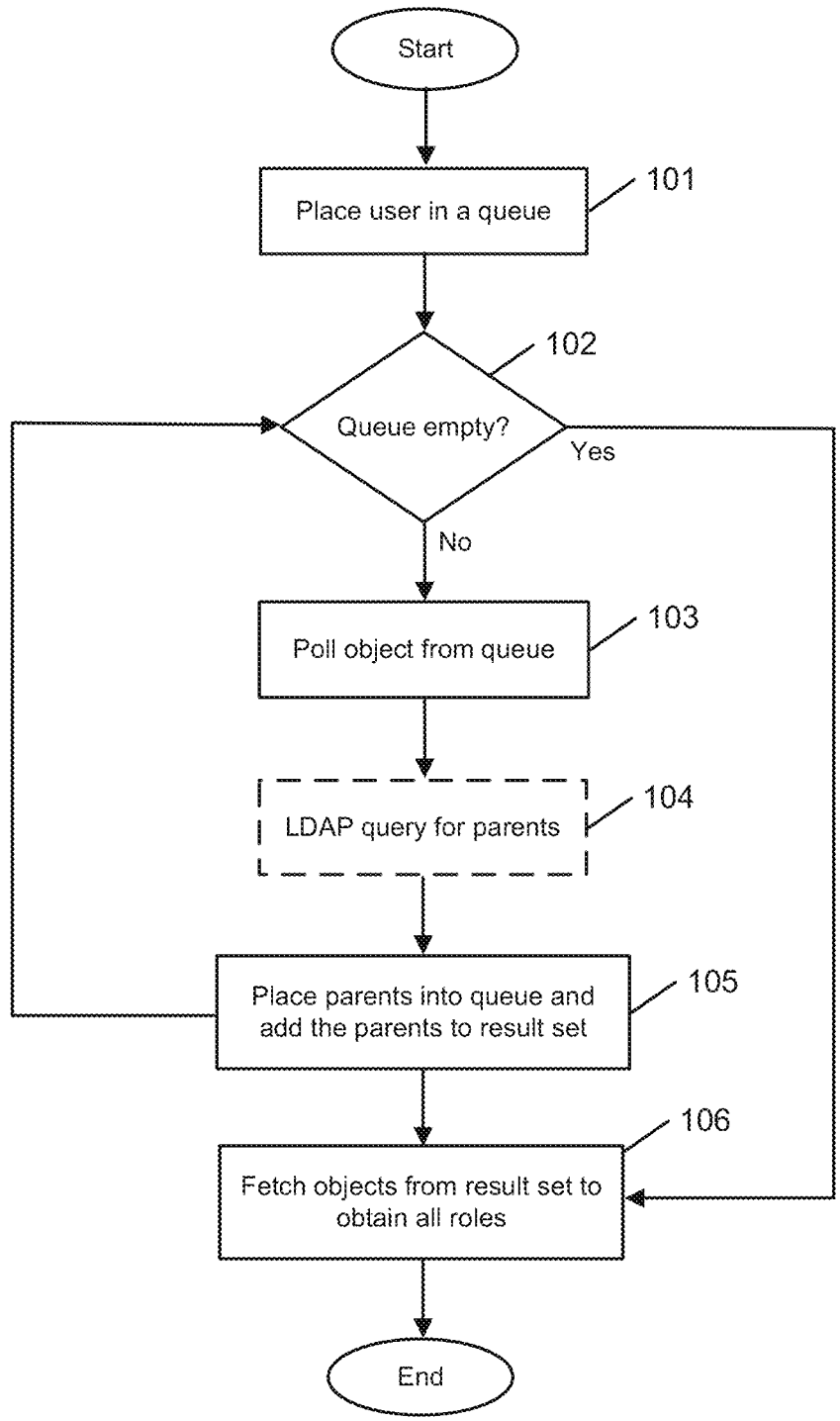
FIG. 1B is a flow diagram illustrating a conventional method of exploring directory service objects.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one embodiment, a set of groups associated with a logon user is determined. The set of groups is partitioned into one or more disjoint subsets, wherein each of the disjoint subsets is represented by a data representation including a root node and one or more intermediate nodes. For each of the disjoint subsets, the disjoint subset is path compressed to flatten a structure of the data representation representing the disjoint subset. The data representation is cached to a database cache.

In one embodiment, for each of the disjoint subsets, each node included in the data representation representing the disjoint subset is ranked by assigning a rank to the node, wherein the rank is a number of paths from the node to the root node.

In another embodiment, for each of the disjoint subsets, the database cache is updated according to an update to the disjoint subset, wherein the update includes (i) removing an existing group from the subset, (ii) adding a parent-child relationship between groups in the subset, or (iii) removing a parent-child relationship between groups in the subset.

In yet another embodiment, for each of the disjoint subsets, the rank for each node included in the data representation is updated in accordance with the update.

In still another embodiment, to update the rank for each node, the node is removed from the disjoint subset in response to determining that the rank of the node is zero (0).

In another embodiment, to partition the set of groups into one or more disjoint subsets, a union find is performed on the set of groups to obtain the one or more disjoint subsets.

In still another embodiment, to cache the data representation to the database cache, the data representation is separately cached to a separate set of data elements included in the database cache.

In yet another embodiment, to update the database cache according to the update, (i) the data representation representing the subset is reevaluated from a first node as a root node and the data representation is merged by decreasing the ranking, (ii) if the first node is in the database cache, the data representation is reevaluated starting from the first node as a root node and the data representation is merged by increasing the ranking, or (iii) if the first node is in the database cache, the data representation is reevaluated starting from the first node as a root node and the data representation is merged by decreasing the ranking.

Figure 2:
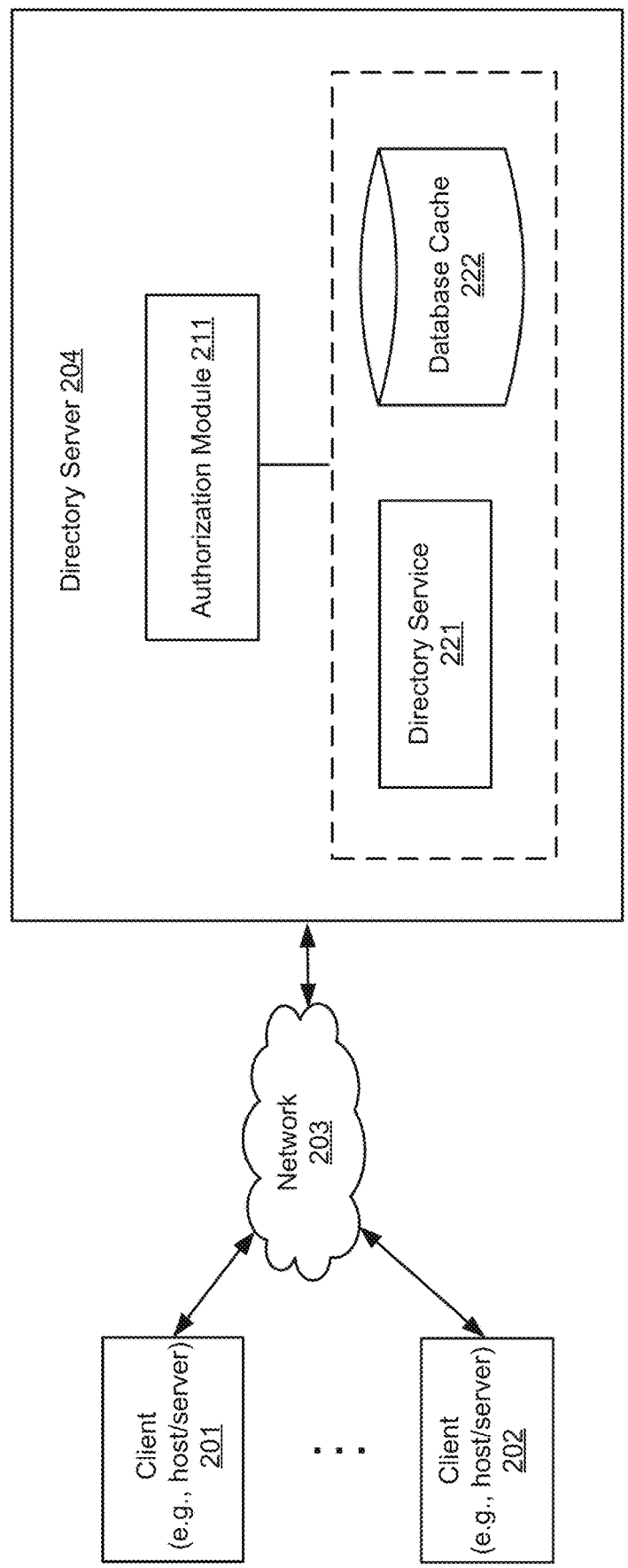
FIG. 2 is a block diagram illustrating an example of a directory service system according to one embodiment.

FIG. 2 is a block diagram illustrating an example of a directory service system according to one embodiment. Referring to FIG. 2, system 200 includes, but is not limited to, one or more client systems 201-202 communicatively coupled to a directory server 204 over network 203. Clients 201-202 may be any type of clients such as a host or server, a personal computer (e.g., desktops, laptops, and tablets), a "thin" client, a personal digital assistant (PDA), a Web enabled appliance, a mobile phone (e.g., Smartphone), or a wearable device (e.g., smartwatch), etc. Alternatively, any of clients 201-202 may be a primary storage system (e.g., local data center) that provides storage to other local clients, which may periodically back up the content stored therein to a backup storage system (e.g., a disaster recovery site or system). In one embodiment, any of clients 201-202 may be an LDAP client that sends requests (e.g., LDAP queries) and receives responses (e.g., directory service search results) in accordance with the LDAP protocol. Network 203 may be any type of networks such as a local area network (LAN), a wide area network (WAN) such as the Internet, a fiber network, a storage network, a cellular network, or a combination thereof, wired or wireless. Clients 201-202 may be in physical proximity or may be physically remote from one another.

With continued reference to FIG. 2, directory server 204 may include authorization module 211 coupled to directory service 221 and database cache 222, with the directory service 221 and database cache 222 also including in the directory server 204. Directory server 204 may include or represent any type of servers or a cluster of one or more servers (e.g., an LDAP server). Directory service 221 may store, organize, and provide access to directory information in order to unify network resources. That is, directory service 221 may be a shared information infrastructure for locating, managing, administering and organizing items and network resources (which may be referred to as objects), which may include users, groups, volumes, folders, files, printers, devices, telephone numbers, and other objects. In one embodiment, directory service 221 may define a namespace for the network. The namespace may be used to assign a name (or identifier) to each of the objects. In one embodiment, directory service 221 may store, manage, and provide access to the directory information in a number of directories (or directory trees) of different types, with each of the directories formed in a hierarchical structure (e.g., root node, intermediate or leaf nodes, parent nodes, child nodes, etc.).

Authorization module 211 is configured to authorize a user logon (e.g., from a user operating an LDAP client) and determine one or more roles assigned to the user. For example, in response to a user logon, authorization module 211 may communicate with directory service 211 to traverse one or more directories and define how to identify different root groups (or nodes) that are associated with the user in the directories. That is, authorization module 211 may determine how to explore and store group relationships with the user. In one embodiment, authorization module 211 may invoke a union-find (or disjoint-set) algorithm to partition a set of groups associated with the user into a number of disjoint (or non-overlapping) subsets. The authorization module 211 may identify connections among the subsets of groups, and perform path compression to flatten the data structure of the directory (or directory tree) of the groups by making every group point to the root group. Authorization module 211 may then cache the groups into database cache 222 (e.g., structured query language (SQL) database, Elasticsearch, etc.) based on the path-compressed data structure. Once database cache 222 is built, it can be queried (e.g., LDAP query) in order to authorize and determine one or more roles for the user.

Figure 3A:
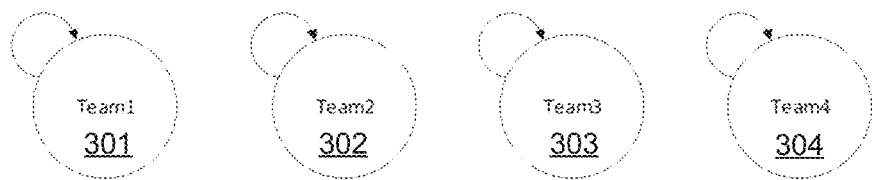
FIGS. 3A-3C are data representations illustrating an example of union finding and path compression of a set of groups stored in a directory according to one embodiment.
Figure 3B:
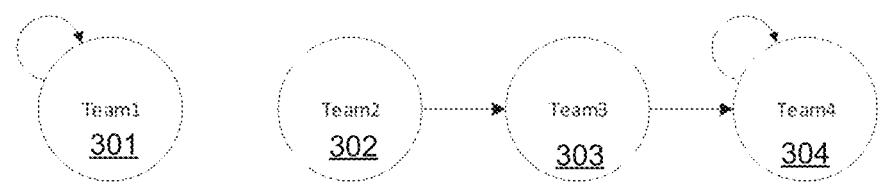
Figure 3C:
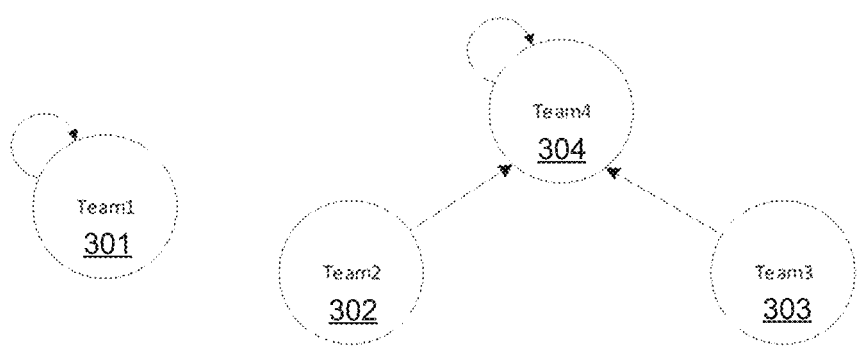

FIGS. 3A-3C are data representations (e.g., graphs) illustrating an example of union finding and path compression of a set of groups stored in a directory according to one embodiment. In one embodiment, the union finding and path compression techniques described herein below may be performed by authorization module 211 of FIG. 2.

With reference to FIG. 3A, when a user is logged on, a query may be received to request one or more groups that are associated with the user. In response to the query, a directory managed by directory service 221 may be traversed to find or determine the group(s) associated with the user. For example, consider the data sample of FIG. 1A (as previously described), where there are four groups in the data sample (e.g., "Team1", "Team2", "Team3", and "Team4" under the "Direct groups" column). Initially, each of the groups may be independent without any connections, as shown by groups 301-304 (also referred to as nodes) of FIG. 3A, where groups 301-304 are respectively labelled as "Team1", "Team2", "Team3", and "Team4". When a union-find is performed on groups 301-304, direct and indirect connections may be found among groups 301-304 (as illustrated in FIG. 3B). The union-find is generally used to unite a disjoint set of groups that are directly or indirectly connected. Such union-find may provide near-constant-time operations to add a new set of data elements (e.g., groups), to merge an existing set, or to determine whether the data elements (e.g., groups) are in the same set. The above described union-find technique is generally known to people skilled in the art.

With continued reference to FIG. 3B, group 301 may be considered a root node since it is independent and not connected to another group via an edge. In one embodiment, group 301 may also be considered a leaf (or intermediate) node since it has an edge pointing towards itself. As shown, group 302 has an edge pointing towards group 303, which has an edge pointing towards group 304. In this case, group 302 may be a child group to group 303 (a parent group), and group 303 may be a child group to group 304 (another parent). Accordingly, in FIG. 3B groups 302-303 may be considered intermediate nodes, while group 304 may be considered a root node since it does not have an edge pointing towards another node. Similar to group 301, group 304 may also be considered as an intermediate node as it has an edge pointing towards itself.

Subsequent to the performance of union-find, a path compression algorithm may be invoked and performed on the groups (or nodes) 301-304 along with their associated edges. The path compression is also generally well known to people skilled in the art. After performing the path compression, groups 301-304 may be arranged as illustrated in FIG. 3C. As shown in FIG. 3C, the path compression generates two separate disjoint sets of groups, namely group 301 ("Team1") and group 304 ("Team4"), which are root group of each set. As further shown, both groups 302-303 now have edges pointing directly towards group 304.

In one embodiment, given m connections and n elements, the time complexity T of the union-find is within a range at $$\sum_{[B, 2^B-1]} * \sum_u 2^B \leq T \leq 2n \log^* n$$

Therefore, the time complexity is O(m log n).

Now that groups 301-304 are path compressed to generate two disjoint sets of groups, a cache may be built. To build the cache, it begins with the root groups (e.g., groups 301 and 304) since the assigned role(s) of a user correspond to root groups. This is because it is more efficient to explore starting from the root group since the relevant groups are the child or children of the root group. For each root group (e.g., group 301 or group 304), an individual data representation (e.g., a graph) may be built so that the root groups do not interfere or affect one another when the cache is built or updated.

Accordingly, referring now to FIGS. 4A-4D, which illustrates an example of cache building according to one embodiment, the cache (e.g., database cache 222 of FIG. 2) may initially be built with group 301 ("Team1"), which has been assigned to a role "Role3" (as shown in FIG. 1A). If a query (e.g., LDAP query) is performed on group 301, there will be no child group associated with "Team1". Thus, the final graph of root group 301 is as illustrated in FIG. 4A, with group 301 existing independently and having an edge pointing to itself. Next, group 303 ("Team3") may be built as it has been assigned a role "Role4". If a query is performed on group 303, group 302 ("Team2") would be found as its child group. After performance of union find and path compression, the graph for group 303 will be in accordance with FIG. 4B, where group 302 has an edge pointing towards group 303, which has an edge pointing towards itself. Similarly, the cache may be built using group 304 ("Team4") as it has been assigned a role "Role5". If a query is performed on group 304, group 303 would be found as its child group. Recursively, group 302 is also found as the child of group 303. After performance of union find and path compression, the graph of group 304 will be in accordance with FIG. 4C, where groups 302-303 having edges pointing towards group 304, which as an edge pointing to itself.

In one embodiment, the graphs of groups 301, 303 and 304 may be cached (e.g., in database cache 222) in a form of a set of data elements, such as a table (as illustrated in FIG. 4D) having a "Root SSID" column and a "Child SSID" column. In another embodiment, the groups 301, 303 and 304 may be separately cached such that each group is cached in a separate set of data elements (e.g., one group per table). Therefore, with respect to the graph of group 304, there are three records in the table, as shown in FIG. 4D.

Since there are a fixed number of root groups by default, compare to the normal union find and path compression, n is now the number of nodes relevant to a root node, and m=n. The algorithm therefore is optimized to:

$$\sum_{i=1}^{k} g_{(K_i)}$$

The $g_{(K_i)}$ is the number of nodes relevant to $i^{th}$ root node $K_i$.

In some embodiments, there may be multiple paths from a root group (or node) to a child node. In those cases, a rank may be computed and assigned to each edge of a node, where the rank identifies a number of paths from the node to its root node. As such, a higher ranking (i.e., a low rank value, such as "1") may indicate a lower number of paths to reach the root node, whereas a lower ranking (i.e., a higher rank value) may indicate a higher number of paths to reach the root node. Referring now to FIG. 5A as an example, suppose a new group 505 is added to the LDAP, and group 505 is a direct child of group 304 ("Team4") and a direct parent group of group 302 ("Team2"). As shown, there are two paths from group 304 to group 302. In this case, the two paths to group 302 may be merged when performing path compression.

Accordingly, when union-find and path compression are performed on group 304, the final graph may be arranged as illustrated in FIG. 5B. That is, each of groups 302, 303, and 505 has an edge pointing towards group 304, with group 304 having an edge pointing towards itself. Since there are two paths to reach to group 302 from root group 304 (as previously described), group 302 may have a ranking of two (2), and the final cache with the ranking applied is illustrated in FIG. 5C, with the "Rank" column added to the table. By ranking the groups, it may facilitate the updating of the cache when changes are found to the LDAP. In one embodiment, as the LDAP changes (i.e., the previously described graphs), the ranking may also change (e.g., increase or decrease) since the number of paths to reach the root node may change. In one embodiment, if the ranking of a node is decreased to zero (0), the node may be removed from the cache.

Generally, an LDAP topology (e.g., the graphs previously described) may change (or update) from time to time. Thus, the changes need to be monitored in order to perform actions to update the cache accordingly. The monitoring can be done with a periodic reevaluation of the root groups, or a dedicated monitor can be set up on each directory server (e.g., LDAP server).

In various embodiments, since a notification system cannot be setup on the directory server, the cache may need to be updated to-date by periodically reevaluating the root groups and updating the cache. In one embodiment, to reevaluate the root nodes, the cache building techniques (as previously described in FIGS. 4A-4D) may be applied. To accelerate the overall performance, embodiments of the disclosure may (i) fetch all root nodes from a search system, (ii) perform parallel evaluation for each root node, since each graph maps to only one root node, (iii) after reevaluation, compare the new graph with the previous one in the database cache in order to reduce the number of updates to the database cache, (iv) update the database cache according to the updated graph, and (v) the interval of reevaluation may be configurable, or even smartly controlled according to number of root nodes and an average evaluation time. In this way, there is no need to setup a dedicated monitor on each monitored directory server.

In some embodiments, suppose a notification mechanism is setup, every time a change (or update) occurs, the change is received and an update to the database cache is generated. Such events may include: (i) removing an existing group A from LDAP, (ii) adding a parent-child relationship between groups A and B (A as parent), and/or (iii) removing a parent-child relationship between groups A and B (A as parent). Since only the groups and their associated relationships are cached, the user-related events may be ignored. Accordingly, the actions to take once any of the above three event occurs are illustrated in FIG. 6 under the "Actions to take" column. In this way, the data may be updated in real-time.

In one embodiment, subsequent to building the cache, a user may be authorized by querying the cache. For example, a user "Zhou Ba" in the data sample of FIG. 1A may not have roles that are directly assigned to him/her, but he/she belongs to group 303 ("Team3"). A cache query (e.g., LDAP query) may be sent to find the group(s) "Zhou Ba" belongs to within the cache. In this scenario, group 303 would be found. This therefore requires only O(1) time in querying the LDAP. Then, an SSID "9" of group 303 ("Team3") may be used as a query condition to query the cache. As an example, if the cache is built in Elasticsearch, a cache query, as shown in FIG. 7, may be invoked and the return values are shown in FIG. 8. This is also performed in O(1) time. Since a separate data representation (e.g., graph) is generated for each root group, although the query is across different graphs, the return values do not contain any duplication of root nodes. As such, data aggregation does not need to be performed for the return values.

In one embodiment, a list of root groups may be obtained from the return values indicating "Zhou Ba" belongs to groups 303 ("Team3") and group 304 ("Team4"). Accordingly, the roles assigned to "Zhou Ba" (e.g., "Role4", "Role5") may be obtained by querying the role table (e.g., "Assigned Roles" column) for roles belonging to groups 303-304. The query is as illustrated in FIG. 9. Again, such query takes O(1) time and the return values are illustrated in FIG. 10.

Figure 11:
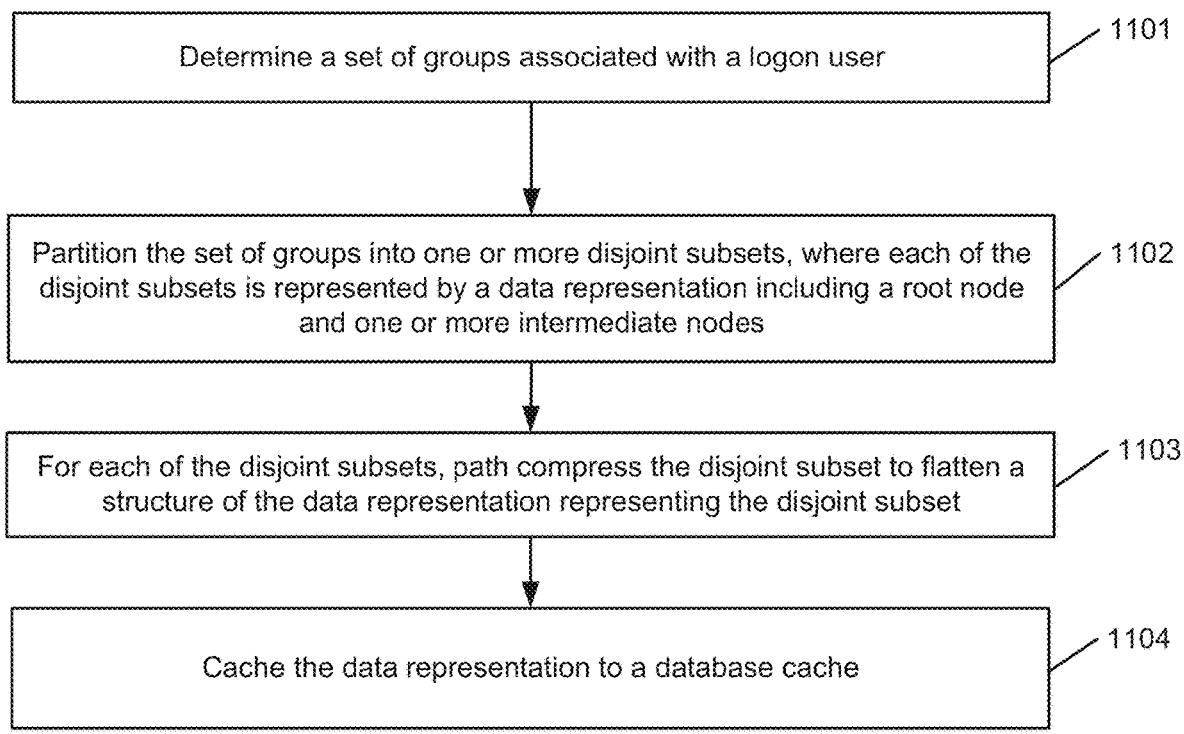
FIG. 11 is a flow diagram of a method of maintaining a database cache according to one embodiment.

FIG. 11 is a flow diagram illustrating a method of maintaining a database cache according to one embodiment. Process 1100 may be performed by processing logic that includes hardware (e.g. circuitry, dedicated logic, etc.), software (e.g., embodied on a non-transitory computer readable medium), or a combination thereof. For example, process 1100 may be performed by directory server 204 (e.g., authorization module 211 of FIG. 2).

Referring to FIG. 11, at block 1101, the processing logic determines a set of groups associated with a logon user. At block 1102, the processing logic partitions the set of groups into one or more disjoint subsets, where each of the disjoint subsets is represented by a data representation including a root node and one or more intermediate nodes. At block 1103, for each of the disjoint subsets, the processing logic path compresses the disjoint subset to flatten a structure of the data representation representing the disjoint subset. At block 1104, the processing logic caches the data representation to a database cache (e.g., database cache 222 of FIG. 2).

Note that some or all of the components as shown and described above (e.g., directory server 204) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 12:
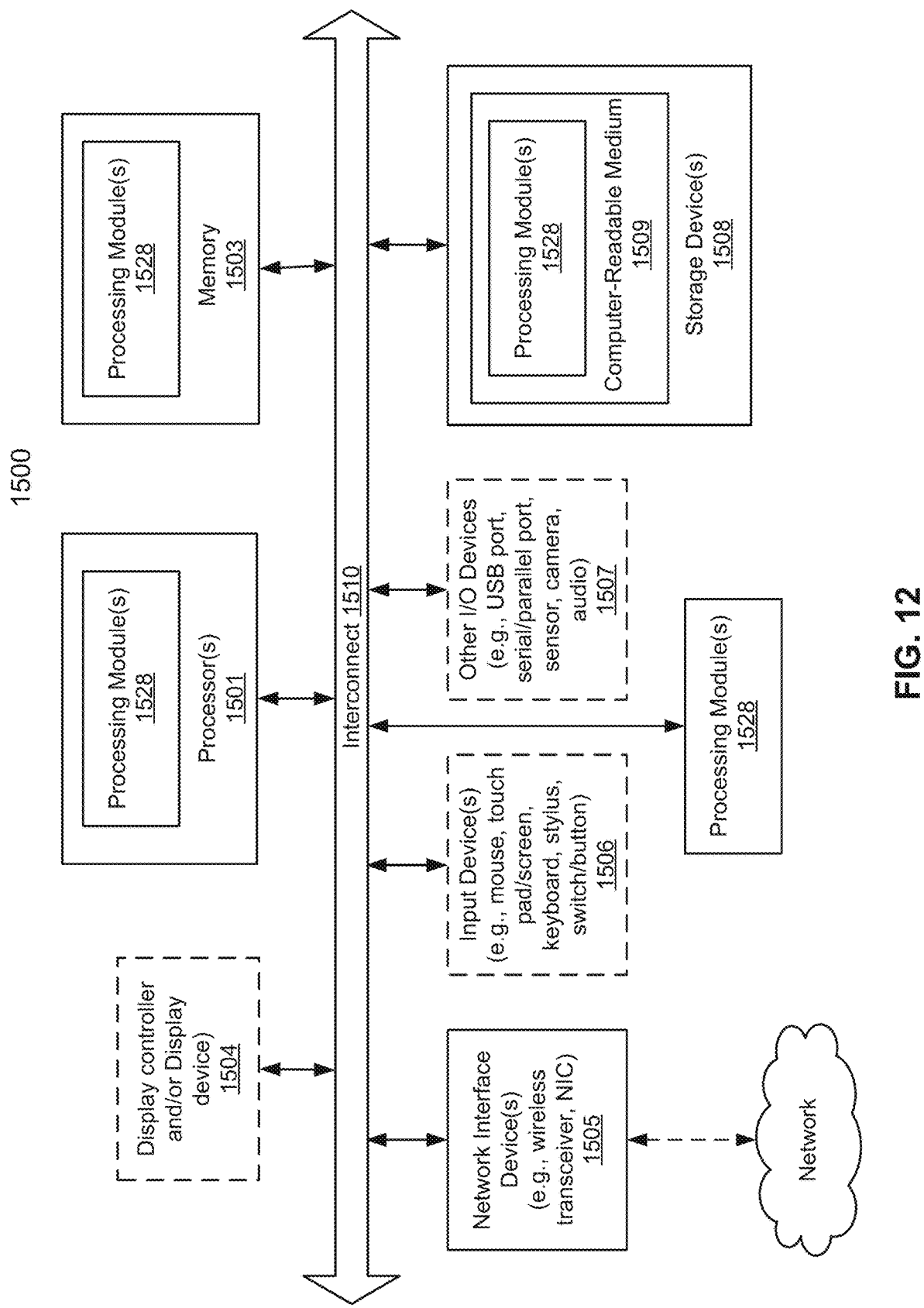
FIG. 12 is a block diagram illustrating a data processing system according to one embodiment.

FIG. 12 is a block diagram illustrating an example of a data processing system which may be used with one embodiment. For example, system 1500 may represents any of data processing systems described above performing any of the processes or methods described above. In one embodiment, system 1500 may be implemented as part of clients 201-202 or directory server 204. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of caching user groups in a directory service, the method comprising:

determining a set of independent user groups, wherein each user group includes one or more users, and each user group either has an assigned role or does not have an assigned role;

for each user group having an assigned role,
 building a data representation to be cached by:
  performing a lightweight directory access protocol (LDAP) query on the user group to determine whether the user group has an associated child group,
  in response to determining that the user group does not have an associated child group, determining that the user group is a root group, and building the data representation to be cached using a data representation for the user group, and
  in response to determining that the user group has an associated child group, performing union find and path compression on the data representation for the user group, and building the data representation to be cached using the path compressed data representation;
 caching the built data representation to a database cache; and
for each cached data representation, ranking each user group included in the cached data representation by assigning a rank to the user group, wherein the rank identifies a number of paths from the user group to a root group in the cached data representation.

2. The method of claim 1, further comprising:
updating the database cache according to a change in an LDAP topology, wherein the update includes (i) removing an existing user group from a cached data representation, (ii) adding a parent-child relationship between user groups in the cached data representation, or (iii) removing a parent-child relationship between user groups in the cached data representation.

3. The method of claim 2, further comprising:
updating the rank for each user group included in the cached data representation in accordance with the update.

4. The method of claim 3, wherein updating the rank for each user group comprises removing the user group from the cached data representation in response to determining that the rank of the user group is zero (0).

5. The method of claim 1, wherein caching the built data representation to the database cache comprises: separately caching each user group in the built data representation to a separate set of data elements included in the database cache.

6. The method of claim 2, wherein updating the database cache according to the update comprises (i) reevaluating the cached data representation from a first user group as a root group and merging the cached data representation by decreasing the ranking, (ii) if the first user group is in the database cache, reevaluating the cached data representation starting from the first user group as a root group and merging the cached data representation by increasing the ranking, or (iii) if the first user group is in the database cache, reevaluating the cached data representation starting from the first user group as a root group and merging the cached data representation by decreasing the ranking.

7. A non-transitory machine-readable medium having instructions stored therein, which when executed by a processor, cause the processor to perform operations, the operations comprising:

determining a set of independent user groups, wherein each user group includes one or more users, and each user group either has an assigned role or does not have an assigned role;

for each user group having an assigned role,
 building a data representation to be cached by:
  performing a lightweight directory access protocol (LDAP) query on the user group to determine whether the user group has an associated child group,
  in response to determining that the user group does not have an associated child group, determining that the user group is a root group, and building the data representation to be cached using a data representation for the user group, and
  in response to determining that the user group has an associated child group, performing union find and path compression on the data representation for the user group, and building the data representation to be cached using the path compressed data representation;
 caching the built data representation to a database cache; and
for each cached data representation, ranking each user group included in the cached data representation by assigning a rank to the user group, wherein the rank identifies a number of paths from the user group to a root group in the cached data representation.

8. The non-transitory machine-readable medium of claim 7, wherein the operations further comprise:
updating the database cache according to a change in an LDAP topology, wherein the update includes (i) removing an existing user group from a cached data representation, (ii) adding a parent-child relationship between user groups in the cached data representation, or (iii) removing a parent-child relationship between user groups in the cached data representation.

9. The non-transitory machine-readable medium of claim 8, wherein the operations further comprise:
updating the rank for each user group included in the cached data representation in accordance with the update.

10. The non-transitory machine-readable medium of claim 9, wherein updating the rank for each user group comprises removing the user group from the cached data representation in response to determining that the rank of the user group is zero (0).

11. The non-transitory machine-readable medium of claim 7, wherein caching the built data representation to the database cache comprises: separately caching each user group in the built data representation to a separate set of data elements included in the database cache.

12. The non-transitory machine-readable medium of claim 8, wherein updating the database cache according to the update comprises (i) reevaluating the cached data representation from a first user group as a root group and merging the cached data representation by decreasing the ranking, (ii) if the first user group is in the database cache, reevaluating the cached data representation starting from the first user group as a root group and merging the cached data representation by increasing the ranking, or (iii) if the first user group is in the database cache, reevaluating the cached data representation starting from the first user group as a root group and merging the cached data representation by decreasing the ranking.

13. A data processing system, comprising:
a processor; and a memory coupled to the processor to store instructions, which when executed by the processor, cause the processor to perform operations, the operations including determining a set of independent user groups, wherein each user group includes one or more users, and each user group either has an assigned role or does not have an assigned role;

for each user group having an assigned role,
  building a data representation to be cached by:
    performing a lightweight directory access protocol (LDAP) query on the user group to determine whether the user group has an associated child group,
    in response to determining that the user group does not have an associated child group, determining that the user group is a root group, and building the data representation to be cached using a data representation for the user group, and
    in response to determining that the user group has an associated child group, performing union find and path compression on the data representation for the user group, and building the data representation to be cached using the path compressed data representation;
  caching the built data representation to a database cache; and
for each cached data representation, ranking each user group included in the cached data representation by assigning a rank to the user group, wherein the rank identifies a number of paths from the user group to a root group in the cached data representation.

14. The data processing system of claim 13, wherein the operations further include updating the database cache according to a change in an LDAP topology, wherein the update includes (i) removing an existing user group from a cached data representation, (ii) adding a parent-child relationship between user groups in the cached data representation, or (iii) removing a parent-child relationship between user groups in the cached data representation.

15. The data processing system of claim 14, wherein the operations further include updating the rank for each user group included in the cached data representation in accordance with the update.

16. The data processing system of claim 15, wherein updating the rank for each user group comprises removing the user group from the cached data representation in response to determining that the rank of the user group is zero (0).

17. The data processing system of claim 13, wherein caching the built data representation to the database cache comprises: separately caching each user group in the built data representation to a separate set of data elements included in the database cache.

18. The data processing system of claim 14, wherein updating the database cache according to the update comprises (i) reevaluating the cached data representation from a first user group as a root group and merging the cached data representation by decreasing the ranking, (ii) if the first user group is in the database cache, reevaluating the cached data representation starting from the first user group as a root group and merging the cached data representation by increasing the ranking, or (iii) if the first user group is in the database cache, reevaluating the cached data representation starting from the first user group as a root group and merging the cached data representation by decreasing the ranking.

* * * * *